United States Patent [19]

Satou

[11] 4,248,555
[45] Feb. 3, 1981

[54] DRILL ASSEMBLY
[75] Inventor: Masanori Satou, Suita, Japan
[73] Assignee: Showa Machine Industries Co., Ltd., Osaka, Japan
[21] Appl. No.: 65,045
[22] Filed: Aug. 9, 1979
[51] Int. Cl.³ ............................................. B23B 51/00
[52] U.S. Cl. ..................................... 408/225; 408/186
[58] Field of Search ............... 408/186, 193, 189, 195, 408/196, 201, 197, 198, 199, 209, 223, 231, 224, 225, 232, 233; 407/40, 41, 42, 55

[56] References Cited
U.S. PATENT DOCUMENTS

| 140,905 | 7/1873 | Erdmann | 407/40 |
|---|---|---|---|
| 654,861 | 7/1900 | Tynan | 408/189 |
| 1,851,613 | 3/1932 | Albee | 407/40 |
| 1,939,490 | 12/1933 | Dixon | 408/196 |
| 3,304,597 | 2/1967 | Kozran | 408/224 |
| 3,324,909 | 6/1967 | McCranie | 408/233 |
| 3,945,753 | 3/1976 | Byers et al. | 408/201 |

FOREIGN PATENT DOCUMENTS 979803  1/1965  United Kingdom .................... 408/224

Primary Examiner—Harrison L. Hinson
Attorney, Agent, or Firm—Wenderoth, Lind & Ponack

[57] ABSTRACT

A drill assembly has two inserts clamped in the respective radial recesses formed in the body. One insert has a straight edge and the other insert has a notched edge. The arrangement is such that the notched edge of the other insert is disposed slightly above the straight edge of one insert.

6 Claims, 5 Drawing Figures

DRILL ASSEMBLY

The present invention relates to a drill assembly.

Drill assemblies having two or more inserts radially mounted thereon are known in the art, but such conventional drill assemblies had a disadvantage of large cutting resistance because the inserts have straight cutting edges. Therefore, the cutting efficiency was unsatisfactory particularly in cutting holes with large diameters.

An object of the present invention is to provide a drill assembly which obviates the above-mentioned shortcoming and permits efficient drilling with much less cutting resistance.

Other objects and advantages of the present invention will become apparent from the following description taken with reference to the accompanying drawings, in which.

Figure 1:
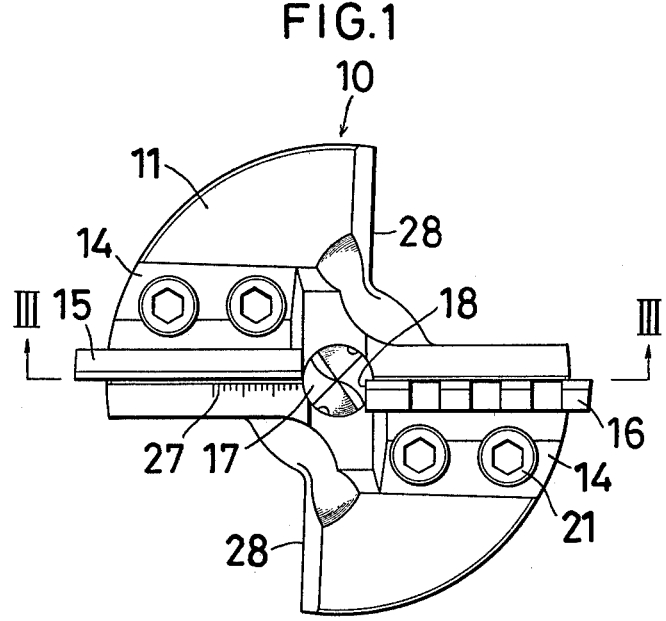
FIG. 1 is a top plan view of a drill assembly according to the present invention.
Figure 2:
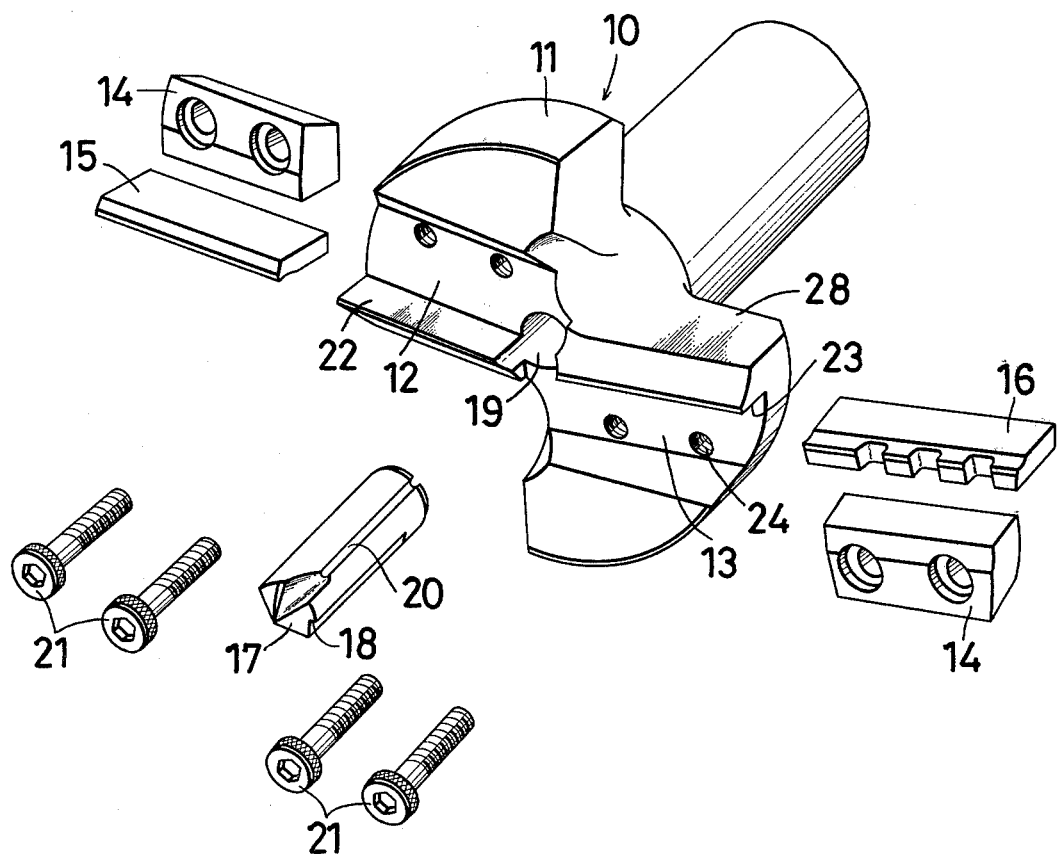
FIG. 2 is an exploded perspective view thereof.
Figure 3:
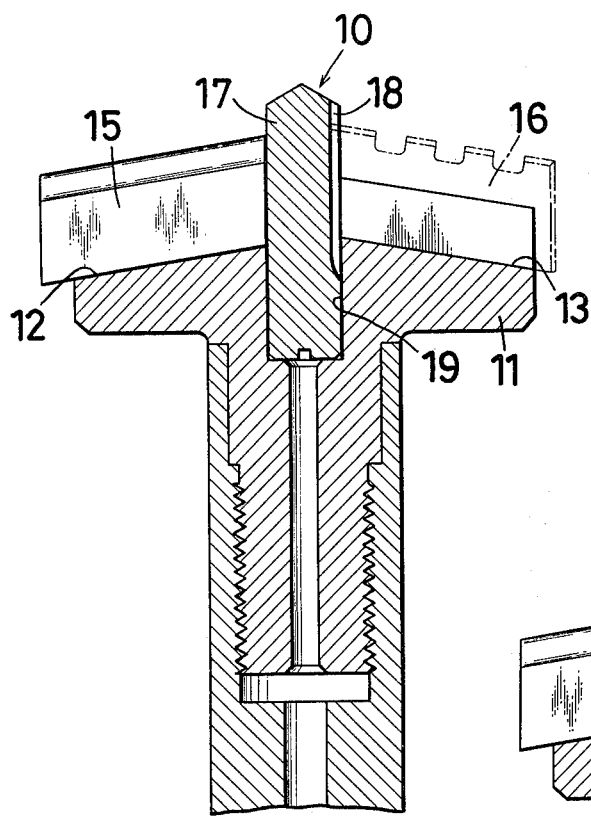
FIG. 3 is a vertical sectional view thereof taken along the line III—III of FIG. 1.

Referring to FIGS. 1–3, the drill assembly according to the present invention generally designated by numeral 10 includes a body 11 formed in its top surface with two radial recesses 12 and 13. Two inserts 15 and 16 are adapted to be clamped in said radial recesses 12 and 13, respectively, by means of cotters 14. A center drill 17 is mounted in a center hole 19 axially formed in the center of the body 11. The insert 15 has a straight cutting edge whereas the other insert 16 has a notched cutting edge with a plurality of notches.

The radial recesses 12 and 13 formed in the body 11 have one vertical surfaces 22 and 23, respectively, at one side thereof and have inclined surfaces at the other side. The cotters 14 are of a shape complementary to that of the recesses 12 and 13. When the cotters 14 are pushed into the recesses 12 and 13 with the inserts 15 and 16, respectively, the cotters act as a wedge, thus clamping the respective inserts in the recesses against the vertical surfaces 22 and 23.

The surfaces 22 and 23 of the recesses 12 and 13 should preferably be in alignment with the axial center of the body 11, but this is not a limitation. The surfaces 22 and 23 may also be inclined instead of being vertical so long as the cotters 14 have a shape complementary thereto.

The center drill 17 has an axial groove 18 extending from its top to near its bottom. When mounted in the recess 13, the notched insert 16 is adapted to have its inner end engaging in said groove 18 in the center drill 17 so as to prevent the center drill from turning with respect to the drill body 11. The center drill 17 has axial grooves 20 which provide a passage for cutting oil. Clamping bolts 21 are tightened through the cotter 14 into bolt holes 24 formed in the body 11 to clamp the cotters 14.

As will be seen in FIG. 3, the recess 13 for the insert 16 is slightly shallower than the recess 12 for the insert 15 so that the notched edge of the insert 16 will be slightly above the straight edge of the insert 15. Alternatively, instead of making one recess shallower than the other, these recesses may have the same depth with the inserts 15 and 16 having different heights. The requirement is that the insert 16 is adapted to have its notched edge disposed above the straight edge of the other insert 15.

The ratio of the notched portions of the edge of the insert 16 to the straight portions thereof should preferably be about 50% for the reason which will be described later.

The body 11 is marked with a scale 27 to know how much the insert 15 projects from the outer periphery of the body 11. The body 11 is also formed with two angular cuts 28 for chip ejection.

Figure 4:
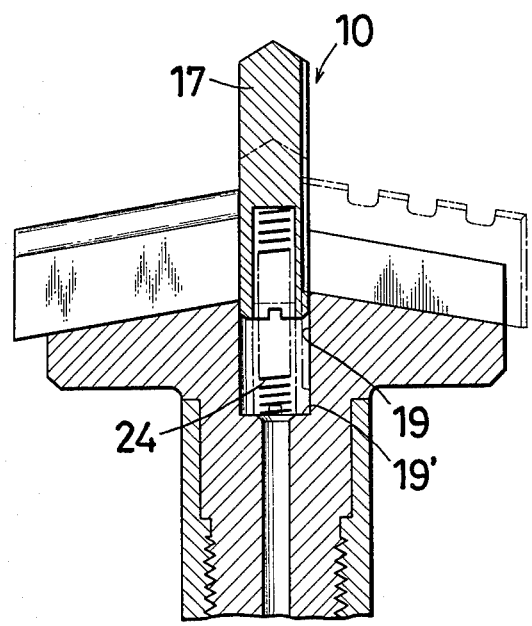
FIG. 4 is a similar view of the second embodiment.
Figure 5:
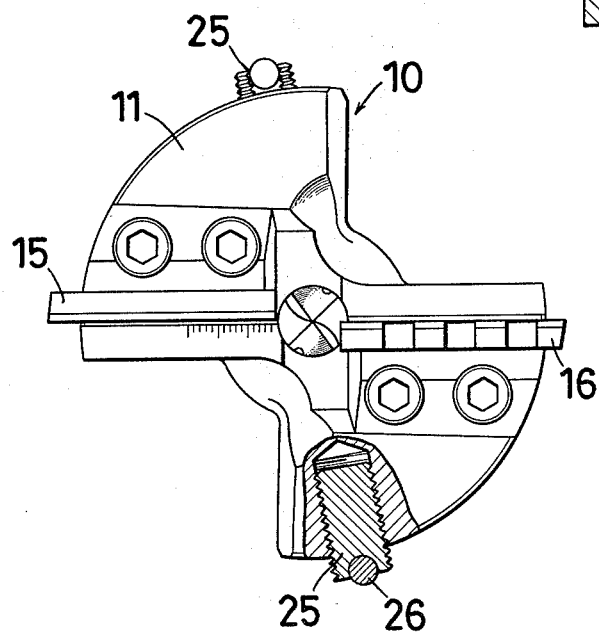
FIG. 5 is a top plan view thereof.

Referring next to FIGS. 4 and 5 showing the second embodiment of the present invention, a spring 24 is provided at the bottom of the center hole 19 so that the center drill 17 will project more than in the first embodiment. This gives a better view of the tip of the center drill, thus facilitating the positioning of the drill. In use, the center drill 17 is pushed into the center hole 19 against the bias of the spring 24 into position as indicated by a chain line in FIG. 4.

Two guide bolts 25 having a ball 26 embedded therein at top thereof are screwed radially into the body 11 at suitable positions so as to project from the outer periphery of the body to substantially the same extent as the insert 15 or 16 does. These guide bolts serve to minimize undue runout during drilling.

Since the notched edge of one insert 16 is disposed slightly above the straight edge of the other insert 15, the notched edge firstly cuts the metal to make as many circular grooves as the straight portions thereof and then the straight edge of the insert 15 cuts off the peaks left between these circular grooves. This manner of cutting considerably reduces the cutting resistance and increases the work efficiency. By taking the ratio of the notched portions of the cutter edge of the insert 16 to the straight portions thereof to about 50% as described before, the cutting resistance on the inserts 15 and 16 are levelled off. This also makes constant the rate of chip ejection from the cuts 28, thus avoiding clogging thereof with chip which would apply excessive torque to the drill assembly.

Another advantage of this invention is that because a guide hole is first cut by means of the center drill 17, accurate drilling work is possible and runout can be minimized. Further, because the insert not engaging the center drill 17 (that is, the insert 15 in the preferred embodiments) may be clamped in any desired position, a single drill assembly can be used to drill holes with different diameters. A further advantage is that the inserts can be replaced easily and quickly.

Although the present invention has been described with reference to the preferred embodiments, it is to be understood that many changes or variations may be made within the scope of the present invention.

What I claim:

1. A drill assembly comprising:
   a body being formed in the center thereof with a center hole axially extending, with two angular cuts for chip ejection, and in the upper surface thereof with two recesses extending radially,
   a center drill mounted in said center hole,
   a first insert having a straight cutting edge,
   a second insert having a notched cutting edge formed with a plurality of notches,
   said first and second inserts being adapted to be clamped in said recesses in such positions that the notched edge of said second insert will be disposed above the straight edge of said first insert, and means for clamping said first and second inserts in said recesses.

2. A drill assembly as claimed in claim 1, wherein the ratio of the notched portion of the cutting edge of said second insert to the straight portion thereof is about 50 percent.

3. A drill assembly as claimed in claim 1, wherein one of said recesses is shallower than the other.

4. A drill assembly as claimed in claim 1, wherein said second insert having a larger height than said first insert.

5. A drill assembly as claimed in claim 1, wherein said center drill has an axial groove in which the inner end of said second insert engages to prevent said center drill from turning with respect to said body.

6. A drill assembly as claimed in claim 1 further comprising a spring disposed at bottom of said center hole so that said center drill will project therefrom accordingly.

* * * * *